United States Patent
Shinohara

(10) Patent No.: US 11,148,009 B2
(45) Date of Patent: Oct. 19, 2021

(54) GOLF BALL PAINT COMPOSITION

(71) Applicant: Bridgestone Sports Co., Ltd., Tokyo (JP)

(72) Inventor: Hirotaka Shinohara, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 38 days.

(21) Appl. No.: 16/693,499

(22) Filed: Nov. 25, 2019

(65) Prior Publication Data

US 2020/0108298 A1 Apr. 9, 2020

Related U.S. Application Data

(63) Continuation-in-part of application No. 15/807,736, filed on Nov. 9, 2017, now Pat. No. 10,526,507.

(30) Foreign Application Priority Data

Nov. 21, 2016 (JP) .................. 2016-225966

(51) Int. Cl.

| C08L 75/06 | (2006.01) |
|---|---|
| C09D 175/06 | (2006.01) |
| C08G 18/42 | (2006.01) |
| A63B 37/00 | (2006.01) |
| C08G 18/73 | (2006.01) |
| C08G 18/72 | (2006.01) |

(52) U.S. Cl.
CPC ...... *A63B 37/0022* (2013.01); *A63B 37/0024* (2013.01); *A63B 37/0074* (2013.01); *C08G 18/4241* (2013.01); *C08G 18/73* (2013.01); *C09D 175/06* (2013.01); *A63B 37/0043* (2013.01); *A63B 37/0045* (2013.01); *A63B 37/0064* (2013.01); *A63B 37/0073* (2013.01); *A63B 37/0076* (2013.01); *A63B 37/0095* (2013.01); *C08G 18/4202* (2013.01); *C08G 18/721* (2013.01); *C08L 75/06* (2013.01)

(58) Field of Classification Search
None
See application file for complete search history.

(56) References Cited

U.S. PATENT DOCUMENTS

| 4,439,599 | A | 3/1984 | Watanabe et al. |
|---|---|---|---|
| 4,999,407 | A | 3/1991 | Gilch et al. |
| 5,166,302 | A | 11/1992 | Werner et al. |
| 6,197,915 | B1 | 3/2001 | Yamana et al. |
| 6,365,679 | B1 | 4/2002 | Crast et al. |
| 7,101,934 | B2* | 9/2006 | Shimura ........... C08G 18/10 473/351 |
| 9,011,272 | B2* | 4/2015 | Isogawa .......... A63B 37/0033 473/376 |
| 2004/0171767 | A1 | 9/2004 | Pohlmann et al. |
| 2013/0079460 | A1 | 3/2013 | Miyahara et al. |

FOREIGN PATENT DOCUMENTS

| JP | 6276814 A | 12/1968 |
|---|---|---|
| JP | 2002053799 A | 2/2002 |
| JP | 2003-253201 A | 9/2003 |
| JP | 2011067595 A | 4/2011 |
| JP | 2012-140614 A | 7/2012 |
| JP | 2015-38163 A | 2/2015 |

OTHER PUBLICATIONS

"type, n.". OED Online. Mar. 2019. Oxford University Press. Retrieved from www.oed.com Apr. 4, 2019. (Year: 2019).*
Communication dated Mar. 10, 2020 from Japanese Patent Office in JP Application No. 2016-225966.

* cited by examiner

*Primary Examiner* — Richard A Huhn
(74) *Attorney, Agent, or Firm* — Sughrue Mion, PLLC

(57) ABSTRACT

A golf ball paint composition includes primarily a urethane paint containing polyol as a base resin and polyisocyanate as a curing agent. The polyisocyanate includes two types of isocyanurate and adduct of hexamethylene diisocyanate and the golf ball paint composition has an elastic work recovery of at least 70%. The paint composition has a high self-repairing ability and is of high quality as a golf ball paint. Golf balls coated with this composition are able to maintain a good durability, in addition to which they have an excellent abrasion resistance and an excellent ball appearance.

7 Claims, No Drawings

GOLF BALL PAINT COMPOSITION

CROSS-REFERENCE TO RELATED APPLICATION

This application is a continuation-in-part of copending application Ser. No. 15/807,736 filed on Nov. 9, 2017, the entire contents of which are hereby incorporated by reference.

TECHNICAL FIELD

This invention relates to a paint composition for golf balls.

BACKGROUND ART

The surface portion of a golf ball is often coated with a paint composition in order to protect the ball surface or to maintain an attractive appearance. Two-part curing polyurethane paints which are used by mixing together a polyol and a polyisocyanate just prior to application are suitably employed as such golf ball paint compositions for a number of reasons, including their ability to withstand large deformation, impact and abrasion (see, for example, JP-A 2003-253201).

A frequent aim of recent golf ball development has been to further lower the spin rate on full shots taken with a driver. This move toward lower spin rates has engendered a trend toward greater softness in the cover serving as the outermost layer of the ball.

Most golf balls have a core, a cover positioned outside of the core, and a paint film layer positioned outside of the cover. Making this paint film layer soft also often provides certain advantages, such as contributing to stability in the spin rate of the golf ball and imparting outstanding durability (see, for example, JP-A 2011-67595). Additional related art is described in JP-A 2002-53799.

Golf ball paints which use one type of polyester polyol alone as the polyol component have also been developed.

However, the surface of the paint film layer lacks a good abrasion resistance, and so there is room for further improvement.

SUMMARY OF THE INVENTION

It is therefore an object of this invention to provide a golf ball paint composition which can increase the abrasion resistance of the paint film.

As a result of extensive investigations, the inventor has discovered that, with regard to paint compositions in which the chief component is a urethane paint composed of polyol and polyisocyanate, by using two types of isocyanurate being hexamethylene diisocyanate having comparatively tough characteristics and adduct of hexamethylene diisocyanate having improved softness, and by also preparing the paint composition such that it has an elastic work recovery of at least 70%, paint films obtained from this paint composition have softness and non-yellowing properties, enabling the spin rate to be improved for a golf ball.

Accordingly, the invention provides a golf ball paint composition comprising a urethane paint containing polyol as a base resin and polyisocyanate as a curing agent, wherein the polyisocyanate includes two types of isocyanurate and adduct of hexamethylene diisocyanate and the composition has an elastic work recovery of at least 70%.

The composition of the invention has an elastic work recovery of preferably at least 80%.

In the paint composition of the invention, the compounding ratio by weight ratio of the isocyanurate (A) to the adduct (B) of hexamethylene diisocyanate, expressed as (A)/(B), is preferably from 95/5 to 40/60.

Also, in the paint composition of the invention, the polyol includes one or two types of polyester polyol.

Secondly, the invention provides a golf ball having a core, a cover positioned outside of the core, and a paint film layer positioned outside of the cover wherein the paint film layer is formed of the above paint composition of the first invention.

In the golf ball of the invention, a cover composition forming the cover has an elastic work recovery of at least 35%.

Also, in the golf ball of the invention, letting an elastic work recovery of the paint film be W1 and letting an elastic work recovery of the cover be W2, the difference W1−W2 between the elastic work recovery of the paint film and the elastic work recovery of the cover is at most 40%.

Advantageous Effects of the Invention

The golf ball paint composition of the invention has a high elasticity and thus a high self-repairing ability, giving it a high abrasion resistance as a golf ball paint. Moreover, the paint composition is able to enhance the performance of golf balls painted therewith.

DESCRIPTION OF THE PREFERRED EMBODIMENTS

The objects, features and advantages of the invention will become more apparent from the following detailed description.

The golf ball paint composition of the invention is composed primarily of a urethane paint made up of polyol and polyisocyanate.

One or two types of polyester polyol are used as the polyol in the base resin. In the case of two types of polyester polyol, the polyols include polyester polyol (A) and polyester polyol (B). These two types of polyester polyol have different weight-average molecular weights (Mw), with the Mw of polyester polyol (A) being preferably from 20,000 to 30,000 and the Mw of polyester polyol (B) being preferably from 800 to 1,500. The Mw of polyester polyol (A) is more preferably from 22,000 to 29,000, and even more preferably from 23,000 to 28,000. The Mw of polyester polyol (B) is more preferably from 900 to 1,200, and even more preferably from 1,000 to 1,100.

These two types of polyester polyol can be obtained by the polycondensation of a polyol with a polybasic acid. Illustrative examples of the polyol include diols such as ethylene glycol, 1,2-propanediol, 1,3-propanediol, 1,3-butanediol, 1,4-butanediol, 1,6-hexanediol, neopentyl glycol, diethylene glycol, dipropylene glycol, hexylene glycol, dimethylol heptane, polyethylene glycol and polypropylene glycol; triols, tetraols, and polyols having an alicyclic structure. Illustrative examples of polybasic acids include aliphatic dicarboxylic acids such as succinic acid, adipic acid, sebacic acid, azelaic acid and dimer acid; aliphatic unsaturated dicarboxylic acids such as fumaric acid, maleic acid, itaconic acid and citraconic acid; aromatic polycarboxylic acids such as phthalic acid, isophthalic acid, terephthalic acid, trimellitic acid and pyromellitic acid; dicarboxylic acids having an alicyclic structure, such as tetrahydrophthalic acid, hexahydrophthalic acid, 1,3-cyclohexanedicarboxylic acid, 1,4-cyclohexanedicarboxylic acid and endomethylenetetrahydrophthalic acid; and tris-2-carboxyethyl isocyanurate. In particular, polyester polyols in which cyclic structures have been introduced onto the resin skeleton may be used as polyester polyol (A). Examples include polyester polyols obtained by the polycondensation of a polyol having an alicyclic structure, such as cyclohexane dimethanol, with a polybasic acid; and polyester polyols obtained by the polycondensation of a polyol having an alicyclic structure with a diol or triol and a polybasic acid. Polyester polyols which have a multi-branched structure may be used as polyester polyol (B). Examples include polyester polyols having a branched structure, such as NIPPOLAN 800 from Tosoh Corporation.

The weight-average molecular weight (Mw) of the overall base resin made of these two types of polyester polyols is preferably from 13,000 to 23,000, and more preferably from 15,000 to 22,000. The number-average molecular weight (Mn) of the overall base resin made of these two types of polyester polyols is preferably from 1,100 to 2,000, and more preferably from 1,300 to 1,850. At average molecular weights (Mw and Mn) outside of these ranges, the abrasion resistance of the paint film may decrease. The weight-average molecular weight (Mw) and number-average molecular weight (Mn) are polystyrene equivalent values measured by gel permeation chromatography (GPC) using a differential refractometer.

Although the contents of the two types of polyester polyol (A) and (B) are not particularly limited, based on the overall amount of base resin, the content of polyester polyol (A) is preferably from 20 to 30 wt % and the content of polyester polyol (B) is preferably from 2 to 18 wt %.

When only one kind of polyester polyol is used in the golf ball paint composition of the invention, it is preferable that the type of polyester polyol is the polyester polyol (A) described above.

The polyisocyanate used in this invention includes two types of isocyanurate and adduct of hexamethylene diisocyanate.

The polyisocyanate used in this invention includes two types of isocyanurate and adduct of hexamethylene diisocyanate. The hexamethylene diisocyanate includes modified forms of hexamethylene diisocyanate, for example, polyester-modified hexamethylene diisocyanate and urethane-modified hexamethylene diisocyanate. The hexamethylene derivatives of hexamethylene diisocyanate including the biuret together with the isocyanurate and adduct of hexamethylene diisocyanate.

In the paint composition of the invention, the compounding ratio by weight ratio of the isocyanurate (A) to the adduct (B) of hexamethylene diisocyanate, expressed as (A)/(B), is preferably from 95/5 to 40/60, more preferably 80/20 to 55/45.

Isocyanurate of hexamethylene diisocyanate (HMDI) may be a commercially available products. Examples of such isocyanurate of hexamethylene diisocyanate (HMDI) include "Coronate 2357" (Tosoh Corporation), "Sumidule N3300" (Sumitomo Covestro Urethane Co., Ltd.), "Duranate TPA-100" (Asahi KASEI Corporation), "Takenate D170N", "Takenate D177N" (all of Mitsui Chemicals Corporation) and "Burnock DN-980" (all of DIC Corporation). These may be used singly, or two or more may be used together. Adducts of hexamethylene diisocyanate (HMDI) may be a commercially available products. Examples of such isocyanurate of hexamethylene diisocyanate (HMDI) include "Coronate HL" (Tosoh Corporation), "Takenate D160N" (Mitsui Chemicals Corporation), "Duranate E402-80B", "Duranate E405-70B" (all of Asahi KASEI Corporation) and "Burnock DN-955", "Burnock DN-955S" (all of DIC Corporation). These may be used singly, or two or more may be used together.

The compounding ratio by weight ratio of the isocyanurate (A) to the adduct (B) of hexamethylene diisocyanate, expressed as (A)/(B), is preferably from 95/5 to 40/60 and more preferably from 80/20 to 55/45.

The molar ratio of isocyanate (NCO) groups on the polyisocyanate to hydroxyl (OH) groups on the polyester polyol used in the invention, expressed as NCO/OH, is preferably at least 0.6, and more preferably at least 0.65, and is preferably not more than 1.5, more preferably not more than 1.0, and even more preferably not more than 0.9. When this molar ratio falls below the above lower limit, unreacted hydroxyl groups remain, which may worsen the performance and water resistance as a golf ball paint film. On the other hand, when the molar ratio exceeds the above upper limit, because the number of isocyanate groups becomes excessive, urea groups (which are fragile) form in reactions with moisture, as a result of which the golf ball paint film performance may decline.

An amine catalyst or an organometallic catalyst may be used as the curing catalyst (organometallic compound). Examples of such organometallic compounds include soaps of metals such as aluminum, nickel, zinc or tin. Preferred use can be made of those which have hitherto been formulated as curing agents for two-part curing urethane paints.

Known paint compounding ingredients may be optionally added to the golf ball paint composition. For example, thickeners, ultraviolet absorbers, fluorescent brighteners, slip agents and pigments may be included in suitable amounts.

The golf ball paint composition has an elastic work recovery that must be at least 70%, and is preferably at least 80%. When the elastic work recovery of the inventive paint composition falls outside of this range, the abrasion resistance may worsen. In this invention, because the paint film that forms on the golf ball surface has a high elasticity, the self-recovery ability is high, resulting in an outstanding abrasion resistance. Moreover, various performance attributes of the golf balls coated with this paint composition can be improved. The method of measuring the elastic work recovery of the golf ball paint composition is described later in this specification.

The elastic work recovery is one parameter of the nanoindentation method for evaluating the physical properties of paint films, which is a nanohardness test method that controls the indentation load on a micro-newton (μN) order and tracks the indenter depth during indentation to a nanometer (nm) precision. In prior methods, only the size of the dent (plastic deformation) corresponding to the maximum load could be measured. However, in the nanoindentation method, the relationship between the indentation load and the indentation depth can be obtained by automated and continuous measurement. Hence, unlike in the past, there are no individual differences between observers when visually measuring deformation under an optical microscope, enabling the physical properties of the paint film to be evaluated to a high precision. Given that the paint film on the golf ball surface is strongly affected by the impact of drivers and various other clubs and thus has a not inconsiderable influence on the golf ball properties, measuring the golf ball paint film by the nanohardness test method and carrying out such measurement to a higher precision than in the past is a very effective method of evaluation.

When using the paint composition of the invention, a paint film layer can be formed on the surface of golf balls manufactured by a commonly known method, via the steps of preparing the paint composition at the time of application, applying the composition to the golf ball surface by a conventional painting operation, and drying. The painting method is not particularly limited. For example, suitable use can be made of spray painting, electrostatic painting or dipping.

As described above, the golf ball paint composition of the invention uses a polyester polyol as the base resin and a polyisocyanate as the curing agent. Depending on the painting conditions, various types of organic solvents may be mixed together. Examples of such organic solvents include aromatic solvents such as toluene, xylene and ethylbenzene; ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone; ether solvents such as diethylene glycol dimethyl ether, diethylene glycol diethyl ether and dipropylene glycol dimethyl ether; alicyclic hydrocarbon solvents such as cyclohexane, methyl cyclohexane and ethyl cyclohexane; and petroleum hydrocarbon solvents such as mineral spirits.

The drying step may be similar to that for known two-part curing urethane paints. For the paint composition of the invention, the drying temperature may be set to at least about 40° C., and especially between 40 and 60° C., and the drying time may be set to from 20 to 90 minutes, and especially from 40 to 50 minutes.

The thickness of the paint film layer, although not particularly limited, is typically from 3 to 50 µm, and preferably from 5 to 20 µm.

The paint composition may be used on any type of golf ball, including one-piece golf balls, two-piece solid golf balls having a core and a cover encasing the core, and multi-piece solid golf balls having a core of at least one layer and a multilayer cover encasing the core.

In a second aspect, the present invention is directed to a golf ball having a core, a cover positioned outside of the core, and a paint film layer positioned outside of the cover wherein the paint film layer is formed of the paint composition as described above.

The cover is the part of the ball that encases the core. Examples include covers having at least one layer, including two-layer covers and three-layer covers. In the case of a two-layer cover, the inner layer is called the "intermediate layer" and the outer layer is called the "outermost layer." In the case of a three-layer cover, the respective layers are referred to as, in order from the inside, the "envelope layer," the "intermediate layer" and the "outermost layer." The outside surface of the outermost layer typically has numerous dimples formed thereon for the purpose of enhancing the aerodynamic properties.

The materials making up the various layers of the cover are not particularly limited. These may be formed of, e.g., ionomer resins, polyester resins, polyamide resins, and also polyurethane resins. For example, the intermediate layer may be formed of an ionomer resin or a highly neutralized ionomer resin, and the outermost layer may be formed of a polyurethane resin.

It is preferable that a cover composition forming the cover has an elastic work recovery of at least 35%, preferably 43%. The elastic work recovery is one parameter of the nanoindentation method for evaluating the physical properties of the cover material, which are almost similar explanation as an elastic work recovery of the paint films as described above.

As to the elastic work recovery of the cover, letting an elastic work recovery of the paint film be W1 and letting an elastic work recovery of the cover be W2, the difference W1−W2 between the elastic work recovery of the paint film and the elastic work recovery of the cover is preferable at most 40%, more preferably at most 30%.

The core may be formed using a known rubber material as the base material. A known base rubber such as a natural rubber or a synthetic rubber may be used as the base rubber. More specifically, the use of primarily polybutadiene, especially cis-1,4-polybutadiene having a cis structure content of at least 40%, is recommended. Where desired, a natural rubber, polyisoprene rubber, styrene-butadiene rubber or the like may be used in the base rubber together with the above polybutadiene. The polybutadiene may be synthesized with a titanium-based, cobalt-based, nickel-based or neodymium-based Ziegler catalyst or with a metal catalyst such as cobalt or nickel.

Co-crosslinking agents such as an unsaturated carboxylic acid or a metal salt thereof, inorganic fillers such as zinc oxide, barium sulfate or calcium carbonate, and organic peroxides such as dicumyl peroxide or 1,1-bis(t-butylperoxy)cyclohexane may be compounded with the base rubber. In addition, where necessary, other ingredients such as commercial antioxidants may be suitably added.

The paint film formed using the above paint composition thus has an excellent abrasion resistance and moreover is able to enhance the performance of golf balls, such as by preventing a marked decline in the spin performance of balls that have been coated with the paint composition, even when the balls are repeatedly struck with golf clubs.

EXAMPLES

Synthesis Examples, Working Examples of the invention and Comparative Examples are given below by way of illustration, although the invention is not limited by these Examples.

Working Examples 1 to 3, Comparative Examples 1 and 2

A core-forming rubber composition formulated as shown in Table 1 was prepared and then cured and molded at 155° C. for 15 minutes, thereby producing cores having a to diameter of 36.3 mm. Next, the cover layers (these being, in order from the inside: an envelope layer, an intermediate layer and an outermost layer) formulated of the resin materials shown in the same table were successively injection-molded over the core.

The envelope layer had a thickness of 1.3 mm and a material hardness, expressed in terms of the Shore D hardness, of 52. The intermediate layer had a thickness of 1.1 mm and a material hardness, in terms of the Shore D hardness, of 62. The outermost layer had a thickness of 0.8 mm and a material hardness, in terms of the Shore D hardness, of 47. When the outermost layer was injection molded, numerous dimples were formed at the same time on the outside surface of this layer.

TABLE 1

| Golf ball parts | | Ingredients | Amounts |
|---|---|---|---|
| Cover | Outermost layer | T-8290 | 75 |
| | | T-8283 | 25 |
| | | Hytrel 4001 | 11 |
| | | Titanium oxide | 3.9 |
| | | Polyethylene wax | 1.2 |
| | | Isocyanate compound | 7.5 |
| | Intermediate layer | Himilan 1605 | 50 |
| | | Himilan 1557 | 15 |
| | | Himilan 1706 | 35 |
| | | Trimethylolpropane | 1.1 |
| | Envelope layer | HPF 1000 | 100 |
| Core | | Polybutadiene A | 80 |
| | | Polybutadiene B | 20 |
| | | Organic peroxide | 1 |
| | | Barium sulfate | 9 |
| | | Zinc oxide | 4 |
| | | Zinc acrylate | 43 |
| | | Water | 1.0 |
| | | Zinc salt of pentachlorothiophenol | 0.3 |

Details on the above core materials are given below. Numbers in the tables indicate parts by weight.
Polybutadiene A: Available under the trade name "BR 01" from JSR Corporation
Polybutadiene B: Available under the trade name "BR 51" from JSR Corporation
Organic peroxide: Dicumyl peroxide, available under the trade name "Percumyl D" from NOF Corporation
Barium sulfate: Available under the trade name "Barico #100" from Hakusui Tech
Zinc oxide: Available under the trade name "Zinc Oxide Grade 3" from Sakai Chemical Co., Ltd.
Zinc acrylate: Available from Nippon Shokubai Co., Ltd.
Water: Distilled water, from Wako Pure Chemical Industries, Ltd.
Zinc salt of pentachlorothiophenol: Available from Wako Pure Chemical Industries, Ltd.

Details on the cover (envelope layer, intermediate layer, and outermost layer) materials are given below. Numbers in Table 1 indicate parts by weight.

| | |
|---|---|
| HPF 1000: | An ionomer available from E.I. DuPont de Nemours & Co. |
| Himilan® 1605: | A sodium-based ionomer available from DuPont-Mitsui Polychemicals Co., Ltd. |
| Himilan® 1557: | A zinc-based ionomer available from DuPont-Mitsui Polychemicals Co., Ltd. |
| Himilan® 1706: | A zinc-based ionomer available from DuPont-Mitsui Polychemicals Co., Ltd. |
| T-8290, T-8283: | MDI-PTMG type thermoplastic polyurethanes available from DIC Bayer Polymer under the trademark Pandex. |
| Hytrel 4001: | A polyester elastomer available from DuPont-Toray Co., Ltd. |
| Polyethylene wax: | "Sanwax 161P" from Sanyo Chemical Industries, Ltd. |
| Titanium oxide: | Tipaque R680, available from Ishihara Sangyo Kaisha, Ltd. |
| Isocyanate compound: | 4,4'-Diphenylmethane diisocyanate |

Formation of Paint Film Layer

Next, in each Example, the paint formulated as shown in Table 2 below was coated with an air spray gun onto the surface of the outermost layer on which numerous dimples had been formed, thereby producing golf balls having a 15 µm thick paint film layer formed thereon.

Elastic Work Recovery

The elastic work recovery of the paint was measured using a paint film sheet having a thickness of 50 µm. The ENT-2100 nanohardness tester from Erionix Inc. was used as the measurement apparatus, and the measurement conditions were as follows.

Indenter: Berkovich indenter (material: diamond; angle α: 65.03°)
Load F: 0.2 mN
Loading time: 10 seconds
Holding time: 1 second
Unloading time: 10 seconds The elastic work recovery was calculated as follows, based on the indentation work $W_{elast}$ (Nm) due to springback deformation of the paint film and on the mechanical indentation work $W_{total}$ (Nm).

$$\text{Elastic work recovery} = W_{elast}/W_{total} \times 100(\%)$$

TABLE 2

| | | | Working Example | | | Comparative Example | |
|---|---|---|---|---|---|---|---|
| | | | 1 | 2 | 3 | 1 | 2 |
| Paint formulation (pbw) | Base resin | Polyester polyol (A) | 23 | 25 | 26 | 27.5 | 27 |
| | | Polyester polyol (B) | 15 | 8 | 4 | — | 3 |
| | | Organic solvent | 62 | 67 | 70 | 72.5 | 70 |
| | | (Total content) | (100) | (100) | (100) | (100) | (100) |
| | Molecular weight of overall base resin (Mw/Mn) | | 16,500/ 1,300 | 19,400/ 1,560 | 21,800/ 1,850 | 25,600/ 2,400 | 22,050/ 1,900 |
| | Curing agent | Isocyanurate of HMDI | 42 | 42 | 42 | 42 | 42 |
| | | Organic solvent | 58 | 58 | 58 | 58 | 58 |
| | | (Total content) | (100) | (100) | (100) | (100) | (100) |
| | Molar compounding ratio (NCO/OH) | | 0.89 | 0.74 | 0.65 | 0.57 | 0.48 |
| Properties | Elastic work recovery (%) | | 84 | 80 | 77 | 62 | 64 |
| | Film thickness (µm) | | 50 | 50 | 50 | 50 | 50 |

Synthesis of Polyester Polyol (A)

A reactor equipped with a reflux condenser, a dropping funnel, a gas inlet and a thermometer was charged with 140 parts by weight of trimethylolpropane, 95 parts by weight of ethylene glycol, 157 parts by weight of adipic acid and 58 parts by weight of 1,4-cyclohexanedimethanol, following which the temperature was raised to 200 to 240° C. under stirring and the reaction was effected by continued heating and stirring for 5 hours. This yielded polyester polyol (A) having an acid value of 4, a hydroxyl value of 170 and a weight-average molecular weight (Mw) of 28,000.

Next, the Polyester Polyol (A) synthesized above was dissolved in butyl acetate, thereby preparing a varnish having a nonvolatile content of 70 wt %.

In Working Example 1, a base resin was prepared by mixing 15 parts by weight of Polyester Polyol (B) (a saturated aliphatic polyester polyol available as "NIPPO-LAN 800" from Tosoh Corporation; weight-average molecular weight (Mw), 1,000; 100% solids) and an organic solvent together with 23 parts by weight of the above Polyester Polyol (A) solution. The resulting mixture had a nonvolatile content of 38.0 wt %.

In Working Example 2, a base resin was prepared by mixing 8 parts by weight of Polyester Polyol (B) ("NIPPO-LAN 800" from Tosoh Corporation; 100% solids) and an organic solvent together with 25 parts by weight of the above Polyester Polyol (A) solution. The resulting mixture had a nonvolatile content of 33.0 wt %.

In Working Example 3, a base resin was prepared by mixing 4 parts by weight of Polyester Polyol (B) ("NIPPO-LAN 800" from Tosoh Corporation; 100% solids) and an organic solvent together with 26 parts by weight of the above Polyester Polyol (A) solution. The resulting mixture had a nonvolatile content of 30.0 wt %.

In Comparative Example 1, a base resin was prepared by, as shown in Table 2, dissolving Polyester Polyol (A) alone in butyl acetate without mixing in the above Polyester Polyol (A) solution. The resulting solution had a nonvolatile content of 27.5 wt %.

In Comparative Example 2, a base resin was prepared by mixing 3 parts by weight of Polyester Polyol (B) ("NIPPO-LAN 800" from Tosoh Corporation; 100% solids) and an organic solvent together with 27 parts by weight of the above Polyester Polyol (A) solution. The resulting mixture had a nonvolatile content of 30.0 wt %.

| Measurement of Molecular Weights (Mw and Mn) The molecular weights were measured using the following apparatus. ||
|---|---|
| Apparatus: | HLC-8220, a high-speed gel permeation chromatography system from Tosoh Corporation |
| Columns: | two coupled columns TSK-GEL G2000H$_{XL}$ and TSK-GEL G4000H$_{XL}$ |
| Column Temperature: | 40° C. |
| Detector: | differential refractometer |
| Eluant: | THF |
| Column flow rate: | 0.6 mL/min |

Next, the curing agent shown in Table 2 was dissolved in an organic solvent and used. That is, the isocyanurate of HMDI (Duranate™ TPA-100 from Asahi Kasei Corporation; NCO content, 23.1%; 100% nonvolatiles) and, as organic solvents, ethyl acetate and butyl acetate, were added in the proportions shown in Table 2, thereby preparing the paint.

The golf balls obtained in the respective Working Examples and Comparative Examples were evaluated according to the criteria described below for paint film appearance. The results are shown in Table 3.

Evaluation of Ball Surface Appearance after Sand Abrasion Test

A pot mill with an outside diameter of 210 mm was charged with about 4 kg of sand having a size of about 5 mm, and 15 golf balls were placed in the mill. The balls were agitated in the mill at a speed of about 50 to 60 rpm for 120 minutes, following which the balls were removed from the mill and the appearance of each ball was rated according to the following criteria.

Rating Criteria

Exc: Ball surface is free of conspicuous peeling, blemishes, etc.

Good: Minor scratches and blemishes are visible on ball surface

NG: Large peeling due to abrasion, or blemishes and diminished gloss are conspicuous on ball surface.

Evaluation of Ball Surface Appearance After Sand/Water Abrasion Test

A pot mill with an outside diameter of 210 mm was charged with about 4 kg of sand having a size of about 5 mm and water, and 15 golf balls were placed in the mill. The balls were agitated in the mill at a speed of about 50 to 60 rpm for 120 minutes, following which the balls were removed from the mill and the appearance of each ball was rated according to the following criteria.

Rating Criteria

Exc: Ball surface is free of conspicuous peeling, blemishes, etc.

Good: Minor scratches and blemishes are visible on ball surface

NG: Large peeling due to abrasion, or blemishes and diminished gloss are conspicuous on ball surface.

TABLE 3

| | | Working Example ||| Comparative Example ||
|---|---|---|---|---|---|---|
| | | 1 | 2 | 3 | 1 | 2 |
| Ball properties | Sand abrasion test | Exc | Exc | Good | NG | NG |
| | Sand/Water abrasion test | Good | Good | Good | Good | Good |

The golf ball property results shown in Table 3 demonstrate the following.

The results from the sand abrasion test and the sand/water abrasion test carried out on the golf balls in Working Examples 1 to 3 according to the invention were all good, indicating that these balls had a good paint film appearance.

By contrast, in Comparative Examples 1 and 2, the ball surface following the sand/water abrasion test was good, but peeling due to abrasion, blemishes, diminished gloss, etc. were conspicuous on the ball surface following the sand abrasion test.

Working Examples 4 to 8 and Comparative Examples 3 to 5

A core-forming rubber composition formulated as shown in above Table 1 was prepared and then cured and molded at 155° C. for 15 minutes, thereby producing cores having a diameter of 36.3 mm. Next, the cover layers (these being, in order from the inside: an envelope layer, and an intermediate layer) formulated of the resin materials shown in the same table were successively injection-molded over the core. The envelope layer had a thickness of 1.3 mm and a material hardness, expressed in terms of the Shore D hardness, of 52. The intermediate layer had a thickness of 1.1 mm and a material hardness, in terms of the Shore D hardness, of 62.

As to an outermost layer, the composition formulated as shown in the following Table 4 was prepared. The outermost layer had a thickness of 0.8 mm and a material hardness, in terms of the Shore D hardness, of 47 (I), 43 (II), 56 (III) and 63 (IV) respectively. When the outermost layer was injection molded, numerous dimples were formed at the same time on the outside surface of this layer.

TABLE 4

| Resin materials (pbw) | I | II | III | IV |
|---|---|---|---|---|
| TPU1 | 100 | | | |
| TPU2 | | 100 | | |
| AN 4319 | | | 25 | |
| Himilan 1605 | | | | 50 |
| Himilan 1601 | | | 37.5 | |
| Himilan 1557 | | | 37.5 | |

TABLE 4-continued

| Resin materials (pbw) | I | II | III | IV |
|---|---|---|---|---|
| AM 7329 | | | | 50 |
| Shore D hardness | 47 | 43 | 56 | 63 |

It is noted that additives are formulated in an appropriate amount in each of the above compositions.

Trade names for the materials in the table are indicated below.

TPU1: An aromatic ether-type thermoplastic polyurethane (Shore D hardness, 47) available under the trade name "Pandex" from DIC Covestro Polymer.

TPU2: An aromatic ether-type thermoplastic polyurethane (Shore D hardness, 43) available under the trade name "Pandex" from DIC Covestro Polymer.

AN4319: Available from Dow-Mitsui Polychemicals Co., Ltd. under the trademark Nucrel®.

Himilan 1605, Himilan 1601, Himilan 1557: Ionomers available from Dow-Mitsui Polychemicals Co., Ltd.

AM 7329: Ionomers available from Dow-Mitsui Polychemicals Co., Ltd.

Elastic Work Recovery of Golf Ball Cover

The elastic work recovery of the cover of the golf ball was measured using a golf ball itself non-coated by a paint film as a sample. Nano Indenter G200 from Toyo Corporation was used as the measurement apparatus, and the measurement conditions were as follows.

Indenter: Berkovich indenter (angle α: 130.06°)
Load F: 100 mN
Loading time: 15 seconds
Holding time: 20 second
Unloading time: 15 seconds The elastic work recovery was calculated as follows, based on the indentation work $W_{elast}$ (Nm) due to springback deformation of the cover of the golf ball and on the mechanical indentation work $W_{total}$ (Nm).

$$\text{Elastic work recovery} = W_{elast}/W_{total} \times 100(\%)$$

Next, in each Example, the paint formulated as shown in Table 5 below was coated with an air spray gun onto the surface of the outermost layer on which numerous dimples had been formed, thereby producing golf balls having a 15 nm thick paint film layer formed thereon.

TABLE 5

| | | | Working Example | | | | | Comparative Example | | |
|---|---|---|---|---|---|---|---|---|---|---|
| | | | 4 | 5 | 6 | 7 | 8 | 3 | 4 | 5 |
| Paint formulation (pbw) | Base resin | Polyester polyol (A) | 27.5 | 27.5 | 27.5 | 27.5 | 27.5 | 27.5 | 27.5 | 27.5 |
| | | Polyester polyol (B) | — | — | — | — | — | — | — | — |
| | | Organic solvent | 72.5 | 72.5 | 72.5 | 72.5 | 72.5 | 72.5 | 72.5 | 72.5 |
| | | (Total content) | (100) | (100) | (100) | (100) | (100) | (100) | (100) | (100) |
| | | Molecular weight of overall base resin (Mw/Mn) | 25,600/ 2,400 | 25,600/ 2,400 | 25,600/ 2,400 | 25,600/ 2,400 | 25,600/ 2,400 | 25,600/ 2,400 | 25,600/ 2,400 | 25,600/ 2,400 |
| | Curing agent | Isocyanurate of HMDI | 42.1 | 38.6 | 30.5 | 42.1 | 42.1 | 30.5 | 30.5 | 42.0 |
| | | Adducts of HMDI | 4.7 | 12.9 | 30.5 | 4.7 | 4.7 | 30.5 | 30.5 | — |
| | | Organic solvent | 53.2 | 48.5 | 39.0 | 53.2 | 53.2 | 39.0 | 39.0 | 58.0 |
| | | (Total content) | (100) | (100) | (100) | (100) | (100) | (100) | (100) | (100) |
| | | Compounding weight ratio (Isocyanurate/Adducts) | 90/10 | 75/25 | 50/50 | 90/10 | 90/10 | 50/50 | 50/50 | 100/0 |
| Properties | | Elastic work recovery W1 (%) | 80 | 85 | 90 | 80 | 80 | 90 | 90 | 62 |
| | | Film thickness (μm) | 50 | 50 | 50 | 50 | 50 | 50 | 50 | 50 |
| Outermost cover | | Types | I | I | I | II | III | IV | III | I |
| | | Elastic work recovery W2 (%) | 44 | 44 | 44 | 52 | 35 | 30 | 35 | 44 |
| | | Difference W1 − W2 of Elastic work recovery (%) | 36 | 41 | 46 | 28 | 45 | 60 | 55 | 18 |

Elastic Work Recovery of Paint Film

The elastic work recovery of the paint is the same content as the above measurement of Working Examples 1 to 3 & Comparative Examples 1 and 2 as described above.

In Working Examples 4 to 8 & Comparative Examples 1 to 3, a base resin was prepared by, as shown in Table 5, dissolving Polyester Polyol (A) alone in butyl acetate without mixing in the above Polyester Polyol (A) solution. The resulting solution had a nonvolatile content of 27.5 wt %. It is noted in Table 5 that the Polyester Polyol (A) is the same as Examples using the above Table 2.

Next, the isocyanurate of HMDI (Duranate™ TPA-100 from Asahi Kasei Corporation; NCO content, 23.1%; 100% nonvolatiles, which is the same as the isocyanurate of HMDI of Table 2) and the adduct of HMDI (Duranate™ E402-80B" from Asahi Kasei Corporation; NCO content, 7.6%; 80% nonvolatiles), and, as organic solvents, ethyl acetate and butyl acetate, were added in the proportions shown in Table 5, thereby preparing the paint.

The golf balls obtained in the respective Working Examples and Comparative Examples were evaluated according to the criteria for paint film appearance described above (i.e. the same criteria as Working Examples 1 to 3 & Comparative Examples 1 and 2).

TABLE 6

| | | Working Example | | | | | Comparative Example | | |
|---|---|---|---|---|---|---|---|---|---|
| | | 4 | 5 | 6 | 7 | 8 | 3 | 4 | 5 |
| Ball properties | Sand abrasion test | Good | Exc | Exc | Exc | Good | Good | Good | NG |
| | Sand/Water abrasion test | Good | Good | Good | Good | Good | NG | NG | Good |

Japanese Patent Application No. 2016-225966 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball paint composition comprising a urethane paint containing polyol as a base resin and polyisocyanate as a curing agent, wherein the polyisocyanate includes an isocyanurate of hexamethylene diisocyanate and an adduct of hexamethylene diisocyanate and the cured composition has an elastic work recovery of at least 70%.

2. The paint composition of claim 1, wherein the cured composition has an elastic work recovery of at least 80%.

3. The paint composition of claim 1, wherein the compounding ratio by weight ratio of the isocyanurate of hexamethylene diisocyanate (A) to the adduct (B) of hexamethylene diisocyanate, expressed as (A)/(B), is from 95/5 to 40/60.

4. The paint composition of claim 1, wherein the polyol includes a polyester polyol having a weight-average molecular weight of from 20,000 to 30,000 and a polyester polyol having a weight-average molecular weight of from 800 to 1,500.

5. A golf ball having a core, a cover positioned outside of the core, and a paint film layer positioned outside of the cover wherein the paint film layer is formed of the paint composition of claim 1.

6. The golf ball of claim 5, wherein the cover has an elastic work recovery of at least 35%.

7. The golf ball of claim 5, wherein letting an elastic work recovery of the paint film be W1 and letting an elastic work recovery of the cover be W2, the difference W1-W2 between the elastic work recovery of the paint film and the elastic work recovery of the cover is at most 40%.

* * * * *